United States Patent [19]

Wigley

[11] Patent Number: 4,553,993
[45] Date of Patent: Nov. 19, 1985

[54] MOISTURE ELIMINATOR

[76] Inventor: Albert F. Wigley, c/o Visco Ltd., Stafford Rd., Croydon CR9 4DT, England

[21] Appl. No.: 575,880

[22] Filed: Feb. 1, 1984

[30] Foreign Application Priority Data

Feb. 19, 1983 [GB] United Kingdom ............... 8304683

[51] Int. Cl.$^4$ .......................................... B01D 45/08
[52] U.S. Cl. .................................... 55/440; 55/464; 210/150
[58] Field of Search ............... 55/440, 442–446, 55/464, 465; 210/150, 615, 619

[56] References Cited

U.S. PATENT DOCUMENTS

| 947,393 | 1/1910 | Muchka | 55/440 |
|---|---|---|---|
| 1,588,402 | 6/1926 | Frohlich | 55/440 |
| 1,834,981 | 12/1931 | Stebbins | 55/440 X |
| 1,926,924 | 9/1933 | Sylvan | 55/440 |
| 2,793,017 | 5/1957 | Lake | 55/440 X |
| 2,959,257 | 11/1960 | Campbell . | |
| 3,358,580 | 12/1967 | Freese et al. | 55/440 X |
| 3,405,511 | 10/1968 | Halter et al. | 55/440 |
| 3,482,375 | 12/1969 | Ellingen | 55/440 X |
| 3,517,486 | 6/1970 | Golden | 55/440 |
| 3,618,778 | 11/1971 | Benton et al. | 210/150 |
| 3,904,525 | 9/1975 | Rosenberg | 210/150 |
| 3,961,922 | 6/1976 | Leung | 55/444 X |
| 4,072,478 | 2/1978 | Regehr et al. | 55/440 X |
| 4,198,215 | 4/1980 | Regehr | 55/440 X |
| 4,240,814 | 12/1980 | Regehr et al. | 55/440 X |
| 4,284,135 | 8/1981 | Almqvist et al. | 55/443 X |
| 4,345,997 | 8/1982 | McConnell, Jr. et al. | 210/150 |
| 4,385,987 | 5/1983 | McGinley et al. | 210/150 |
| 4,431,537 | 2/1984 | Hirota | 210/150 |
| 4,455,339 | 6/1984 | Meier | 428/185 |

FOREIGN PATENT DOCUMENTS

| 483705 | 3/1975 | Australia . | |
|---|---|---|---|
| 0023777 | 2/1981 | European Pat. Off. . | |
| 0070920 | 2/1983 | European Pat. Off. . | |
| 1619839 | 5/1967 | Fed. Rep. of Germany . | |
| 2260550 | 7/1974 | Fed. Rep. of Germany | 55/440 |
| 1591072 | 8/1968 | France . | |
| 1456822 | 11/1976 | United Kingdom . | |
| 1570389 | 7/1980 | United Kingdom . | |
| 1603099 | 11/1981 | United Kingdom | 210/615 |

Primary Examiner—Robert Spitzer
Attorney, Agent, or Firm—Murray, Whisenhunt & Ferguson

[57] ABSTRACT

Means for removing liquid droplets from a gaseous stream, in particular a drift eliminator for an evaporative cooling tower, comprising a duct formed with a generally V-shaped relatively large depression which extends along the duct and which is formed in its interior with a sharp corner extending along the depression. The drift eliminator preferably comprises an assembly of plates each having a series of parallel mutually spaced ridges which are generally triangular in transverse cross-section, which ridges form means for spacing apart adjacent plates and which define opposite sides of at least one duct. The reverse sides of the ridges preferably form the depressions which extend along the ducts.

21 Claims, 8 Drawing Figures

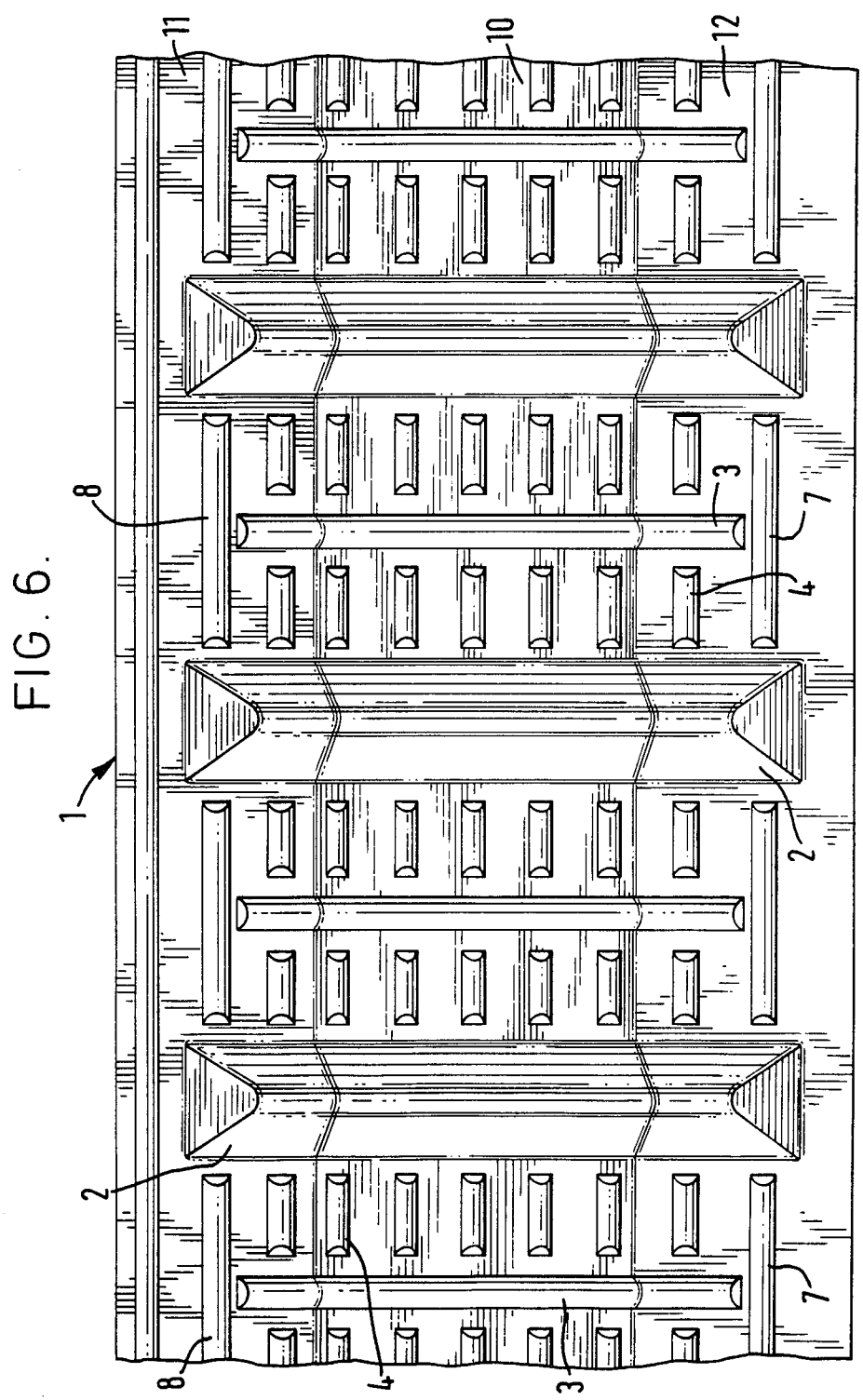

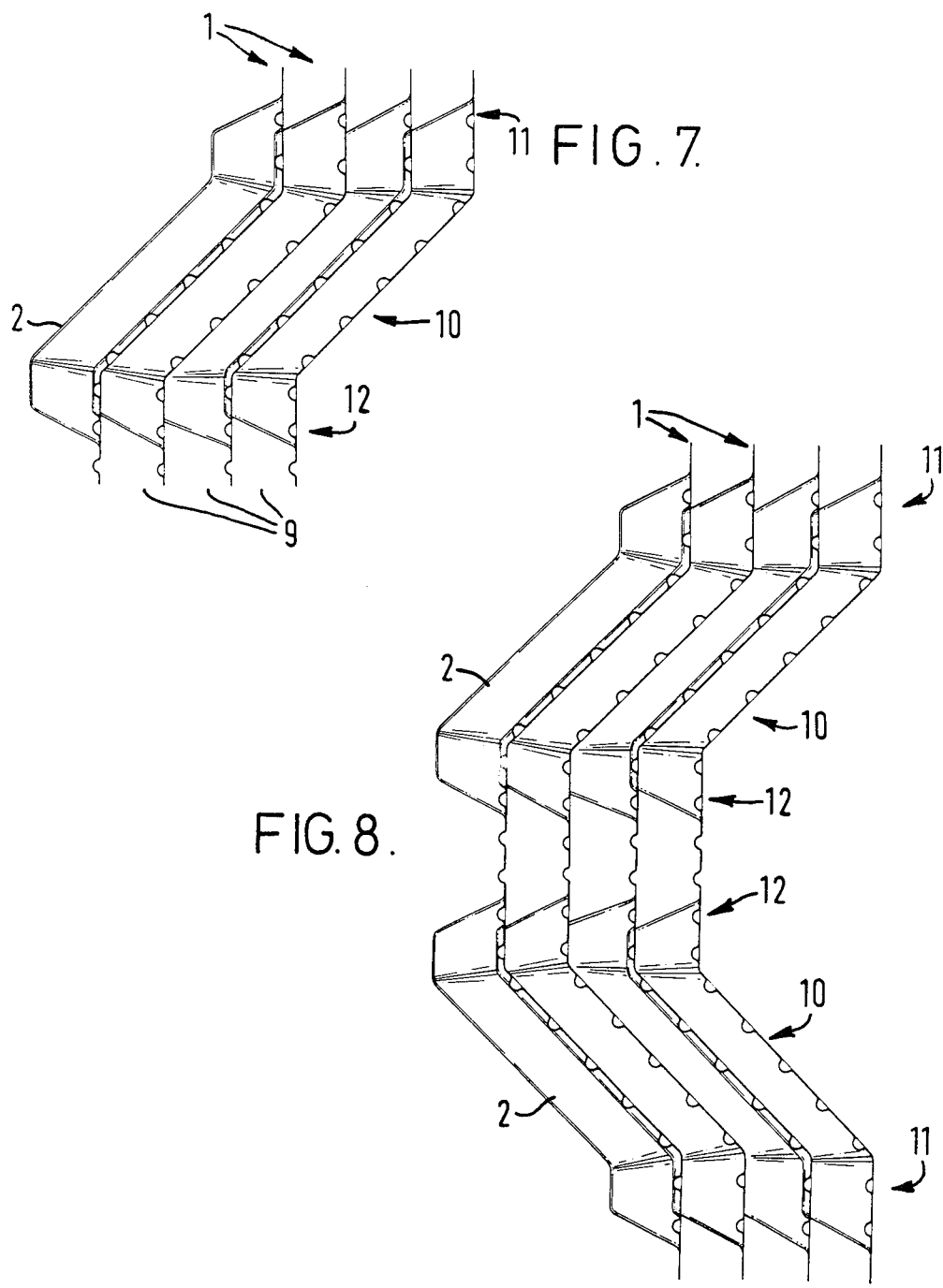

MOISTURE ELIMINATOR

DESCRIPTION

The invention relates to means for extracting liquid droplets from a gas flow and more particularly but not exclusively to a so called moisture or drift eliminator for a cooling tower.

It is known from GB 1457822 of Serck Industries Limited to provide a moisture eliminator comprising a plurality of members spaced apart to define at least one sinuous duct for the flow of gas through the apparatus, at least one of the members being formed with raised elongate portions which project into the or each sinuous duct generally normally to the length of the sinuous duct and are curved along their lengths.

It is an object of the invention to provide an eliminator which is of relatively low cost and high efficiency. Ideally such an eliminator might consist of a large number of small tubular cells. Preferably such cells would be rectangular or hexagonal in cross-section so that the moisture has a large number of corners in which to accumulate, but such an arrangement is expensive to produce being both intricate and using a large amount of material in construction. The present invention seeks to simulate such an arrangement in a simple and economical manner.

According to the invention there is provided means for removing from a gaseous stream liquid droplets entrained therein comprising a duct formed with a depression which extends along the duct and which is formed in its interior with a sharp corner extending along the depression. Preferably the depression extends over a major part of the length of the duct and advantageously the depression extends over substantially the whole length of the duct. Similarly the sharp corner preferably extends along a major part of the depression and advantageously the sharp corner extends along substantially the whole length of the depression.

The depression may be generally V-shaped in transverse cross-section and preferably the included angle between the sides of the V-shaped depression is an acute angle. Advantageously the acute angle is not greater than 45°, and preferably is in the range 36° to 40°. The preferred acute angle is 38°.

The volume of the depression is preferably between 5 and 20% of the volume of the duct, and advantageously is between 10 and 14% of the volume of the duct. The preferred volume of the depression is between 12 and 13% of the volume of the duct.

The transverse cross-sectional shape of the duct excluding the depression may be a quadrilateral and is preferably trapezoidal.

The depression may be located on one of the pair of parallel sides of the duct, and preferably is centrally located on the longer of the pair of parallel sides.

I prefer that the sides of the duct meet one another at sharp corners to provide locations at which liquid can agglomerate.

To create turbulence in the duct I prefer to provide at least one projection extending into the duct from the side thereof opposite to the depression. Preferably the projection is generally semi-circular in transverse cross-sectional shape. In one embodiment I provide a centrally disposed longitudinally extending projection and a plurality of laterally extending projections disposed on opposite sides of the centrally disposed longitudinal projections. Preferably the lateral projections terminate out of contact with the longitudinal projection and out of contact with the corners of the duct. Also to create turbulence the entry to the duct may be of smaller transverse cross-sectional area than the interior of the duct, and/or the duct may change direction at least once along its length. In one embodiment the duct changes direction twice along its length and comprises an entry section and an exit section which are mutually parallel, separated by an intermediate obliquely extending section.

Preferably a moisture eliminator in accordance with the invention consists of a plurality of plates or sheets e.g. of plastics material which are assembled together to form the ducts. The plates which may be thermoformed preferably each consist of a series of mutually parallel ridges which are generally triangular in transverse cross-section, which ridges form means for spacing apart adjacent sheets and which define opposite sides of at least one duct through which the gaseous stream is caused to pass. Preferably the reverse sides of the ridges form depressions extending along the at least one duct, which depressions are formed in their interiors with sharp corners extending longitudinally of the depressions.

Preferably each plate is shaped to form a plurality of ducts having an entrance portion, an intermediate portion extending obliquely to the entrance portion and an exit portion parallel to the entrance portion. Preferably the ridges extend into all three portions. Preferably each duct is formed with projections extending longitudinally and transversely of the duct and disposed opposite to the depression.

Preferably the arrangement is such that the length and configuration of the longitudinal projections correspond to the length and configuration of the crests of the ridges whereby the plates may be assembled one against another with the crests of the ridges received in small recesses on one side of the plates formed by the longitudinal projections so that the plates are firmly located one against another.

The invention is diagrammatically illustrated by way of example in the accompanying drawings in which:

FIG. 6 is a part view taken in the direction of the arrow X of FIG. 4;

FIG. 7 illustrates diagrammatically how the plates can be assembled to form a single pass stack; and FIG. 8 illustrates diagrammatically how the plates can be assembled to form a double pass stack.

Figure 1:
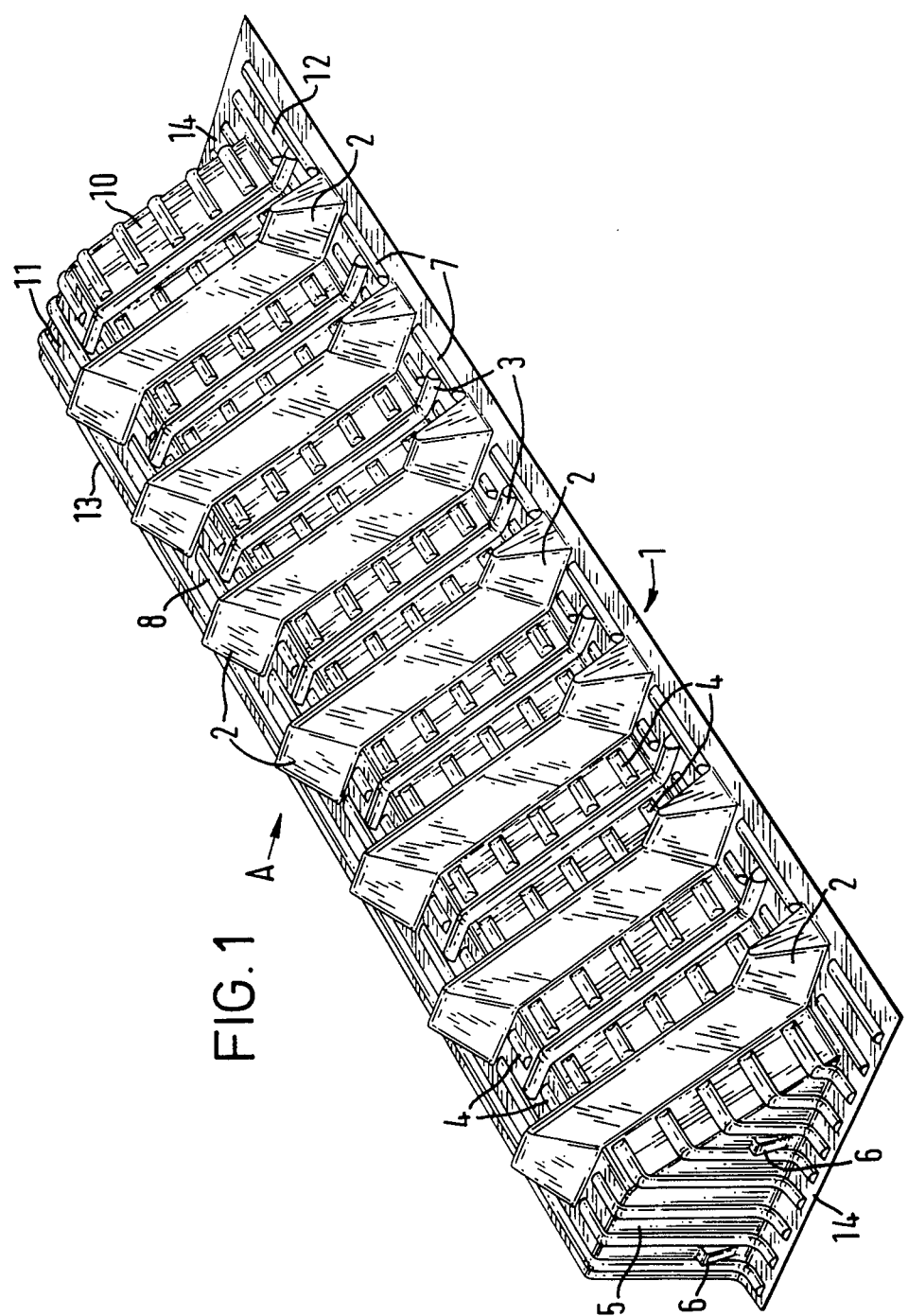
FIG. 1 is a perspective view of a packing sheet or plate forming part of a moisture eliminator in accordance with the invention.

In the drawings there is shown a moisture eliminator, e.g. a drift eliminator packing for a cooling tower, which consists of a series of plates 1 thermoformed from sheet plastics material, although other materials such as stainless steel sheet might also be suitable. Each plate comprises three generally flat portions 10, 11 and 12 respectively, the arrangement being such that the portions 11 and 12 are disposed in mutually parallel planes and are separated by the portion 10, the plane of which extends obliquely to the planes of the portions 11 and 12. The portion 10 is somewhat larger in size than the portions 11 and 12. The plate has marginal portions 14 on opposite sides, which portions 14 are co-planar with the portion 12 and from which extend end walls 5 which connect to the opposite edges of the portions 10 and 11 to lend rigidity to the plate. Abutments 6 project from the ends walls to assist stacking of a series of the plates one upon the other to form the moisture eliminator. Stacking of the sheets is more fully described below.

Each plate is formed with a series of parallel mutually spaced ridges 2 and each ridge starts in the portion 12, extends through the portion 10 and terminates in the portion 11. Each ridge is triangular in transverse cross-section. The surfaces of the portions 10, 11 and 12 between the ridges 2 are each formed with a projection or bead 3 disposed centrally between an adjacent pair of ridges and extending parallel thereto and over substantially the whole length thereof. A transverse bead or projection 7 is disposed at the end of the projection 3 in the portion 12 and a similar transverse projection 8 is disposed at the end of the projection 3 in the portion 11. Both of the projections 7 and 8 are disposed adjacent to, but out of contact with, the ends of the projection 3 and also the ends of the projections 7 and 8 are disposed adjacent to, but out of contact with, the ridges 2. Along the length of the projection 3 are disposed a series of transverse projections 4 arranged on opposite sides of the projection 3 again with their ends disposed adjacent to, but out of contact with, the projection 3 and the respective ridges 2.

Figure 2:
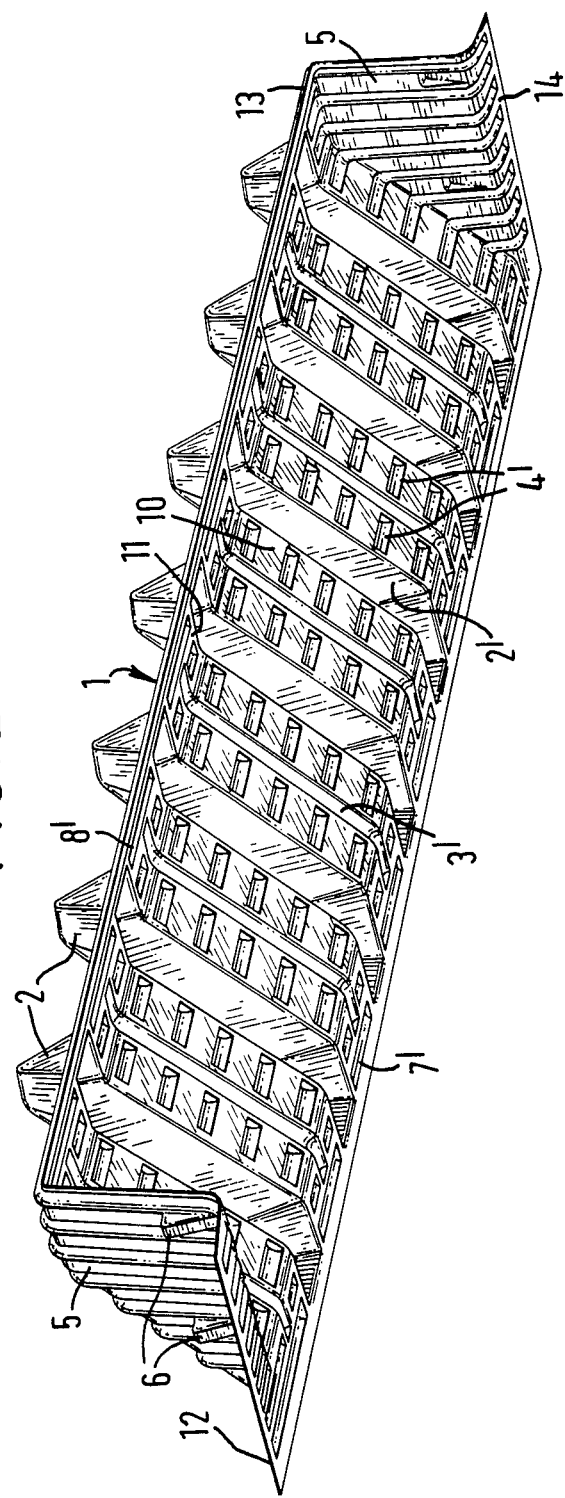
FIG. 2 is a perspective view of the packing sheet or plate shown in FIG. 1 and taken in the direction of the arrow A of FIG. 1.

Since the plate is made from sheet material the undersurface of each plate is formed (as shown in FIG. 2) with recesses or depressions corresponding to the longitudinal projections, the transverse projections 4, 7 and 8 and the ridges 2. Thus the depressions corresponding to the ridges 2 are indicated at 2', and similarly the recesses or depressions corresponding to the longitudinal projections 3 are shown at 3', and the depressions corresponding to the transverse projections 4, 7 and 8 at 4', 7' and 8' respectively.

Figure 3:
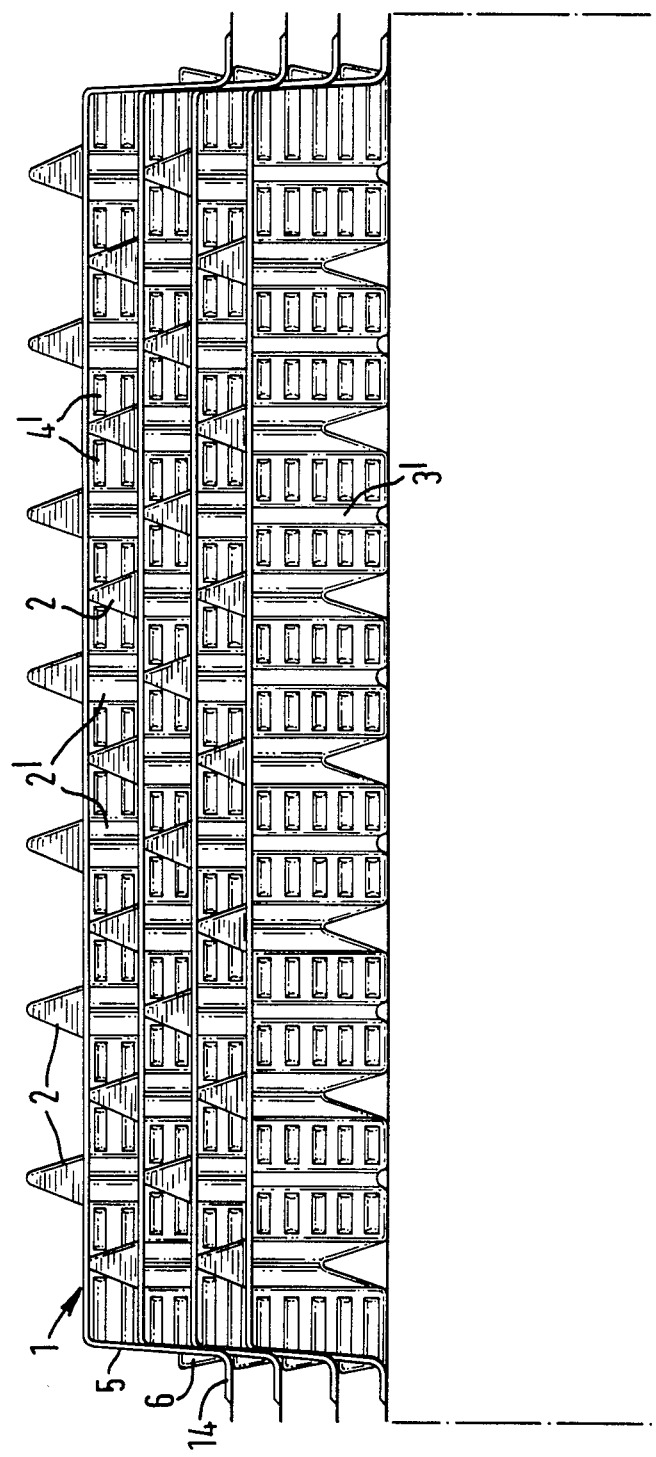
FIG. 3 is an end elevation of a stack of plates of the kind shown in FIGS. 1 and 2 assembled together to form a moisture eliminator.
Figure 4:
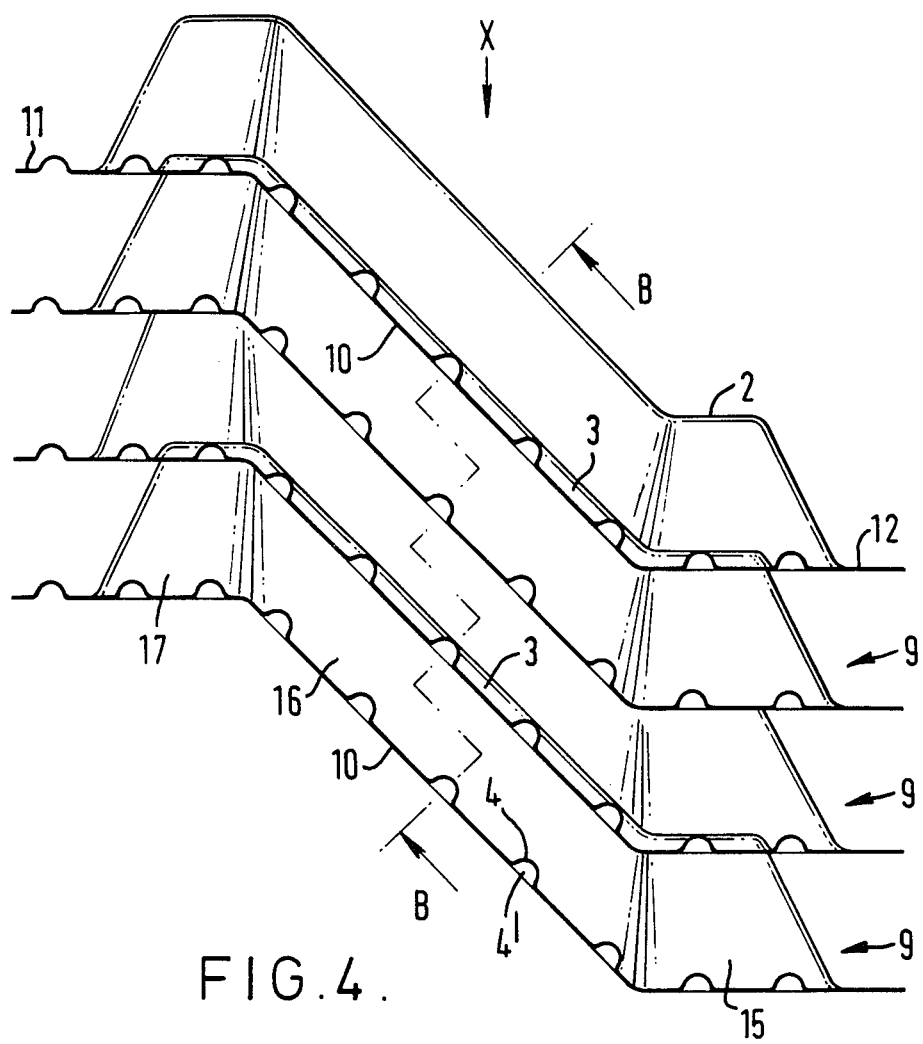
FIG. 4 is a sectional end view of the stack of plates of FIG. 3.
Figure 5:
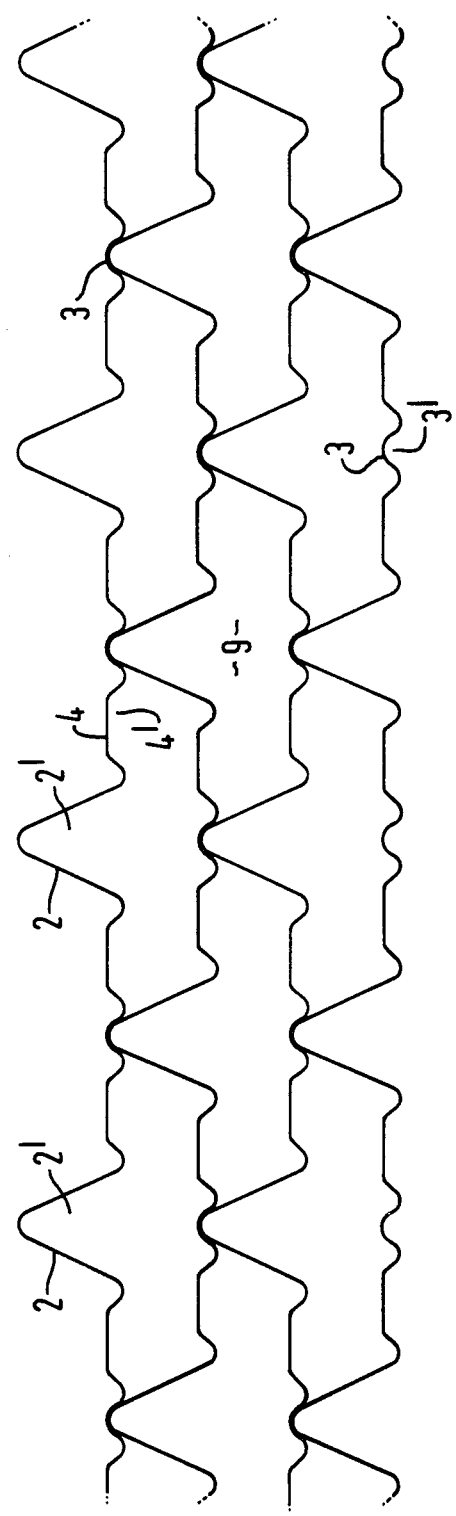
FIG. 5 is a part section on the line B—B of FIG. 4.

The plates described above are stacked together to form a pack as shown in FIGS. 3 to 5 and comprising a plurality of sinuous ducts 9 through which the moisture-laden gas is forced to pass in order to remove the moisture. As already mentioned the ends 5 of the plates are formed with projections 6 and these projections are arranged to abut against the undersides of the marginal portions 14 of the adjacent plates to achieve the correct spacing between the plates. In addition the crests of the ridges 2 locate in the depressions 3' formed by the undersurfaces of the projections 3.

As can best be seen in FIG. 5, each duct 9 is generally trapezoidal in transverse cross-section and is defined on opposite sides by an adjacent pair of ridges 2. One of the pair of parallel sides of each duct 9 is formed with the projections 3, 4, 7 and 8 while the opposite side is formed with small depressions 4' and with a large centrally disposed longitudinal depression 2'. It will be seen that the corners of the duct 9 are sharp to provide areas in which the moisture can agglomerate during its passage through the duct. Similarly the depressions 2' are formed with sharp corners.

In a typical example of cooling tower drift eliminator the angle between the walls of the depression 2' is 38°, and the volume of the depression 2' represents around 13% of the volume of the duct as a whole. Preferably the mean hydraulic radius of the duct, i.e. the cross-sectional area of the duct divided by the length of the perimeter of the duct, is around 8.75.

As can best be seen in FIG. 4, each duct 9 comprises an entrance section 15 defined by the portions 12 of an adjacent pair of plates, an intermediate section 16 defined by the portions 10 of the adjacent pair of plates and an exit section 17 defined by the portions 11 of the adjacent pair of plates. From FIG. 4 it will be seen that the ridges 2 and projections 3, 4, 7 and 8 terminate short of the entrances to the ducts 9 so that the cross-sectional area of the duct entrance is smaller than the cross-sectional area of the interior of the duct. This is also true of the duct exit.

To enable stacking to occur it will be noticed from FIGS. 1 and 2 that the ridges 2 although equispaced one from another are asymmetric on the surface of the plate. Preferably in operation a pair of the plates shown in FIGS. 1 and 2 are produced in a single thermoforming operation and joined together back to back along the edge 13, the plates subsequently being separated e.g. by cutting and assembled as shown in FIG. 3. Thus one plate is turned through 180° with respect to the other so that the ridges 2 on one plate are staggered from the ridges 2 on the adjacent plates. When assembled the plates form a single pass pack as shown in FIG. 7, but alternatively the plates if left uncut can be assembled and used as a double pass pack as shown in FIG. 8. The edges of the plates may be secured one to the other by glue and/or may be mounted in a surrounding framework.

The method of operation of the moisture eliminator described above is as follows.

Moist gas, e.g. air containing water droplets and water bubbles, on entering the ducts 9 of the eliminator pack usually from below as seen in FIGS. 7 and 8, is subjected, both by the sinuous shape of the ducts and by the the projections and depressions therein, to rapid changes in direction of flow and velocity which cause the droplets and bubbles to impinge on the surfaces of the plates. It is thought that a slight negative pressure is created in the large depressions 2' so that the droplets and bubbles are forced into the depressions 2' where they agglomerate in the sharp corners to form large water droplets. Similarly the droplets agglomerate in the corners of the ducts. The droplets which are now large enough not to be carried upwards by the velocity of the air passing through the ducts, are channelled under gravity from the eliminator.

The main advantages of the pack described above are as follows:

1. It eliminates water droplets at higher gas velocities through the eliminator pack than was previously possible.
2. It has an inherently lower pressure drop than known packs and owing to the shape of the plate, it is possible to use greater distances between each plate than previously and this results in the resistance to air flow through the eliminator being even lower.
3. It contains less material in the plate than prior designs in spite of the improved performance.
4. The ends of the plate are so formed that they can be glued together to form an extremely rigid assembly without the need for a frame.

5. Where a frame is desirable the plates are so designed that they easily stack together without the necessity for glueing, i.e. this would be the case with a very wide pack for use in cooling towers of large area.
6. The plates are so designed that they can be stacked flat for transport and it is only when they are turned alternately that they form the pack.
7. It is possible that this pack could be used for water treatment purposes, i.e. BOD (basic oxygen demand).
8. The eliminator can also be used in other applications, i.e. on the outlets from scrubbers or in other devices that use spray systems which require the discharge air to be free of water droplets.
9. The plates can be spaced at almost any pitch one from the other for varying uses.
10. Two eliminator plates still joined together from the vacuum forming can form a double-pass eliminator (see FIG. 8).

I claim:

1. A plate for assembly with similar plates to form at least one duct through which a gaseous stream can be passed to remove liquid droplets from the gaseous stream, the plate being formed from thin sheet material and comprising a first part, a second part and a third part, the first and third parts being disposed in parallel planes, and the second part, which is disposed between the first and third parts, being disposed in a plane which is oblique with respect to the said parallel planes, the plate further comprising a series of parallel mutually spaced ridges which are generally triangular in transverse cross-section, said ridges extending over a major part of the plate and defining the opposite sides of the at least one duct and also forming means for spacing apart adjacent sheets, the reverse sides of the ridges forming depressions which are V-shaped in transverse cross-section, which depressions are formed in their interiors with sharp corners extending longitudinally of the depressions, the ridges being arranged such that each ridge extends into all three parts of the plate, the arrangement being such that on assembly of the plates each said duct is formed with a said depression extending along a substantial part of the length of the duct.

2. Means for removing liquid droplets from a gaseous stream comprising a duct which changes direction at least once along its length, said duct having a transverse cross-sectional shape which is generally trapezoidal, a depression formed in the duct, said depression comprising a pair of mutually inclined walls whereby the depression is generally V-shaped in transverse cross-section, said depression extending longitudinally of the duct over a major part of the length thereof, and a sharp corner extending along the interior of the depression and formed by the junction between the two mutually inclined walls of the depression.

3. Means according to claim 2, in which the depression extends over substantially the whole length of the duct.

4. Means according to claim 2, in which the sharp corner extends along substantially the whole length of the depression.

5. Means according to claim 2, in which the included angle between the sides of the V-shaped depression is an acute angle.

6. Means according to claim 5, in which the acute angle is not greater than 45°.

7. Means according to claim 5, in which the acute angle is between 36° and 40°.

8. Means according to claim 5, in which the acute angle is 38°.

9. Means according to claim 2, in which the volume of the depression is between 5 and 20% of the volume of the duct.

10. Means according to claim 2, wherein the volume of the depression is between 10 and 14% of the volume of the duct.

11. Means according to claim 2, wherein the volume of the depression is between 12 and 13% of the volume of the duct.

12. Means according to claim 2, wherein the depression is located on one of the pair of parallel sides of the duct.

13. Means according to claim 12, wherein the depression is located on the longer of the pair of parallel sides of the duct.

14. Means according to claim 13, wherein the depression is centrally located on the longer of the pair of parallel sides of the duct.

15. Means according to claim 2, in which the sides of the duct meet one another at sharp corners.

16. Means according to claim 2, comprising at least one projection extending into the duct from the side thereof opposite to the depression.

17. Means according to claim 16, in which the projection is generally semi-circular in transverse cross-sectional shape.

18. Means according to claim 16, comprising a centrally disposed longitudinally extending projection and a plurality of laterally extending projections disposed on opposite sides of the centrally disposed longitudinal projection.

19. Means according to claim 2, wherein the entry to the duct is of smaller transverse cross-sectional area than the interior of the duct.

20. Means according to claim 2, in which the duct changes direction twice along its length.

21. Means according to claim 20, in which the duct comprises an entry section and an exit section which are mutually parallel.

* * * * *